United States Patent [19]

Walker et al.

[11] Patent Number: 4,544,701

[45] Date of Patent: Oct. 1, 1985

[54] STAMP MOLDED PARAFFIN SCRAPER

[75] Inventors: John H. Walker, Bartlesville, Okla.; Harold V. Wood, Denton, Tex.

[73] Assignee: Phillips Petroleum Company, Bartlesville, Okla.

[21] Appl. No.: 594,046

[22] Filed: Mar. 28, 1984

[51] Int. Cl.⁴ .............................................. C08K 7/00
[52] U.S. Cl. .................................. 524/609; 428/273; 428/290; 264/257
[58] Field of Search ............... 524/609; 428/273, 290; 264/257, 258

[56] References Cited

U.S. PATENT DOCUMENTS

| | | | |
|---|---|---|---|
| 3,399,730 | 9/1968 | Pourchot | 166/176 |
| 3,434,914 | 3/1969 | Sterman | 428/273 |
| 4,080,735 | 3/1978 | Michalski | 524/609 |
| 4,360,630 | 11/1982 | Smith | 524/609 |
| 4,451,601 | 5/1984 | Blackwell | 524/609 |

Primary Examiner—Paul R. Michl
Attorney, Agent, or Firm—A. W. Umphlett

[57] ABSTRACT

A pair of substantially identical half-sections adapted to be wedged around a rod in locked position with the half-sections stamp molded from a prepreg formed by surrounding at least one fiber mat of inorganic reinforcing material with a matrix of PPS to produce a prepreg containing from about 15 to about 45 weight percent of the inorganic reinforcing material.

7 Claims, No Drawings

STAMP MOLDED PARAFFIN SCRAPER

BACKGROUND OF THE INVENTION

This invention relates to paraffin scrapers. In one of its aspects this invention relates to field installed paraffin scrapers. In still another aspect of this invention it relates to stamp molded prepregs of inorganic reinforcing material surrounded by a poly(phenylene sulfide) matrix.

The use of rod guides and paraffin scrapers is well known in the art. Rod guides, generally made of polymeric material, are fitted around the sucker rods in pumping oil wells to maintain the spacing between the sucker rod and the tube thereby minimizing wear of the tube or rod during the reciprocating action of the rod during the pumping operation. The rod guides are spaced along the sucker rods to provide the protective action.

A paraffin scraper is a rod guide of specific conformation which provides a scraping action to remove paraffin that has solidified around the sucker rod by reduction of temperature as the paraffin is moved up the well toward the surface.

In U.S. Pat. No. 3,399,730 rod guides and paraffin scrapers are set forth which are produced as a pair of substantially identical half-sections which can be placed on the sucker rods in the field and wedged around the rod in a locked position so that the protuberances on the rods are secured in a manner that precludes slippage along the rod. This patent states that a rod guide or paraffin scraper should preferably be constructed from a suitable plastic material which is corrosion resistant, sheds paraffin, and has insulating properties for protection of the rod from electrolytic action. The reference illustrates the rod guide or paraffin scraper only as being made from nylon. U.S. Pat. No. 3,399,730 is incorporated here by reference to show the configuration of a rod guide or paraffin scraper which is essentially the conformation of the produced object useful in the present invention.

It is also known that the properties poly(phenylene sulfide) as far as corrosion resistance, being able to shed paraffin, and having insulating properties for protection of the rod from electrolytic action should provide a material of construction that is quite suitable for the end use set out in this invention. Indeed, rods have been produced that have rod guides or scrapers molded onto the rod during the production process with the rod guide made from poly(phenylene sulfide) with the product achieving excellent results in its end use. There has, however, been a drawback in that, because of the ductility of the material, poly(phenylene sulfide) rod guides such as those set out in U.S. Pat. No. 3,399,730 which can be applied in the field could not be produced from poly(phenylene sulfide). Applicants have now solved the problem of providing a product having the useful characteristics of poly(phenylene sulfide) in the end product but also having suitable ductility to be made into half-sections that can be wedged around a rod in locked position in the field.

It is therefore an object of this invention to provide a rod guide or paraffin scraper of reinforced poly(phenylene sulfide) made as half-sections adapted to be wedged around a rod in the field.

Other aspects, objects and the various advantages of this invention will become apparent upon reading the specification and the appended claims.

STATEMENT OF THE INVENTION

According to this invention a rod guide or paraffin scraper is provided which is suitable for field application. A pair of substantially identical half-sections are provided which are adapted to be wedged around a rod in locked position. The half-sections are stamp molded from a prepreg containing from about 15 to about 45 weight percent inorganic reinforcing material which has been formed by surrounding at least one reinforcing agent fiber mat with a matrix of poly(phenylene sulfide).

The term poly(phenylene sulfide) includes homopolymers and the normally solid phenylene sulfide copolymers, terpolymers and the like having melting or softening points of at least 300° F. (149° C.) and more preferably from about 400° F. to about 900° F. (204°–482° C.). The poly(phenylene sulfide) resins, often abbreviated PPS, contemplated in the compositions of this invention include those described in U.S. Pat. No. 3,354,129 issued to Edmonds, Jr. and Hill, Jr. on Nov. 21, 1967 and those described in U.S. Pat. No. 3,919,177. Although PPS having a wide range of flow rate is suitable for use in the present invention it is presently preferred to achieve a better processibility and appearance that the flow rate of the PPS be in a range of about 4 to about 350 g/10 min and most preferably that the flow rate should fall within a range of about 4 to about 80 g/10 min. These ranges of flow rates can be correlated with melt viscosity of about 300° C. and a sheer rate of about 200 $sec^{-1}$, i.e., 4–350 g/10 min is equivalent to a melt viscosity in a range of about 12,000 to about 1,000 poise and a range of about 4 to about 80 g/10 men is equivalent to a melt viscosity range of about 12,000 to about 3,000 poise. It has been found that the preferred flow rates give better processibility than flow rates in a lower range and that fiber flow and uniformity in the resin matrix is better within the preferred range of melt flow than at melt flows of higher range.

The preferred reinforcing materials useful in the present invention can be chosen from among glass fiber, carbon fiber, or a mixture of glass and carbon fiber. The reinforcing agent is preferably in the form of a mat and the fibers are most preferably cut or chopped. Using cut or chopped fibers, the length of the fibers will usually fall within the range of about 0.64 cm (0.25 in.) to about 25.4 cm (10 in.) preferably within a range of about 1.2 cm (0.5 in.) to about 5.1 cm (2.0 in.). A fiber mat that does not have continuous fibers usually will have a binder material particularly for the shorter fiber lengths. Binders usually are chosen from thermoplastic materials including PPS and thermoset plastics.

It is also within the scope of this invention to use metal fiber mat material as a reinforcing agent. Any metal known to be useful in forming fiber mats can be used in this invention. Among those suitable are iron and the steel alloys, cobalt, nickel, chromium, tungsten, copper and its brass alloys, zinc, magnesium, aluminum and the like.

Other fiber-forming inorganic materials which can be used in the reinforcing agent of this invention can be chosen from those set out in the Encyclopedia of Polymer Science and Technology, Vol. 6, 1967, Interscience Publishers, pp. 610–668, incorporated here by reference, particularly fibers of beryllia, magnesia, alumina, silica, zirconia, thoria, boron, boron nitrite, boron carbide, silicon carbide, alumino-silicate, and the like.

For the purposes of this invention the amount of fiber mat material used as reinforcing agent will usually fall within the range of about 15 to about 45 weight percent of the total composition, preferably from about 20 to about 30 weight percent.

The method for producing the reinforced, stampable composite of PPS and fiber mat useful in this invention encompasses any method by which the fiber mat material can be surrounded with a matrix of PPS, including PPS powder impregnation and subsequent melting of the PPS. Useful methods for producing the reinforced, stampable composite are set out in co-pending application Ser. No. 513,185, filed July 12, 1983, which is incorporated here by reference.

The prepregs produced as described above are then placed within a suitable mold and under conditions of temperature and pressure well known in the art are stamp molded to provide one of a pair of substantially identical half-sections substantially as set out in U.S. Pat. No. 3,399,730 and as further described below.

Each of the half-sections comprises a substantially cylindrical body having a semi-circular inner periphery which is adapted to be positioned against the outer periphery of a circular rod. There are outwardly directed flanges on the body adjacent to the open end of the semi-circular bore which extend longitudinally through substantially half the length of the body. The upper surfaces of the lips are shaped to receive the complimentary surface of the corresponding half-section when the device is assembled. The lower edge or surface of each flange is slightly tapered to cooperate with the tapered surface of the identical half-section for wedging the half-section securely around the rod. There is also a plurality of ratchet teeth or serrations on the outer edge of each flange near its outer end which cooperate with matching serrations on the corresponding half-section securely to lock and prevent accidental reverse reciprocal movement between the half-sections.

It should be stressed that the configuration of the rod guide or paraffin scraper is not part of the present invention. The invention lies in the discovery that poly(phenylene sulfide) can be composited with reinforcing material to produce a prepreg that is of suitable ductility to be stamp molded into a rod guide that can be field applied.

We claim:

1. A rod guide, suitable for field installation, comprising a pair of substantially identical half-sections adapted to be wedged around a rod in locked position, said half-sections stamp molded from a prepreg containing from about 15 to about 45 weight percent of an inorganic reinforcing agent, formed by surrounding at least one inorganic material fiber mat with a matrix of poly(phenylene sulfide).

2. A rod guide of claim 1 wherein said inorganic reinforcing agents formed into a fiber mat comprise a reinforcing material chosen from among glass fiber, carbon fiber, a mixture of glass and carbon fiber, metal fiber, and fiber-forming inorganic material.

3. A rod guide of claim 2 wherein said reinforcing material is chosen from among glass fiber, carbon fiber, and a mixture of glass and carbon fiber.

4. A rod guide of claim 2 wherein said reinforcing agent is chosen from among metal fiber of the group consisting of essentially of iron, steel alloys, cobalt, nickel, chromium, tungsten, copper, brass alloys, zinc, magnesium and aluminum.

5. A rod guide of claim 2 wherein said inorganic reinforcing agent is fiber-forming inorganic material chosen from the group consisting essentially of beryllia, magnesia, alumina, silica, zirconia, thoria, boron, boron nitrate, boron carbide, silica carbide, and alumino-silicate.

6. A rod guide of claim 3 wherein the inorganic reinforcing agent is chopped glass.

7. A rod guide of claim 6 wherein said prepreg contains from about 20 to about 30 weight percent of said inorganic reinforcing agent.

* * * * *